United States Patent [19]

Keeling

[11] 4,149,522

[45] Apr. 17, 1979

[54] SOLAR HEAT COLLECTOR WITH CONVECTION SUPPRESSOR

[75] Inventor: Michael C. Keeling, Phoenix, Ariz.

[73] Assignee: Motorola, Inc., Schaumburg, Ill.

[21] Appl. No.: 771,148

[22] Filed: Feb. 23, 1977

[51] Int. Cl.² ............................................. F24J 3/02
[52] U.S. Cl. .................................... 126/271; 126/270
[58] Field of Search .............. 126/270, 271; 237/1 A; 52/2, 616

[56] References Cited

U.S. PATENT DOCUMENTS

| 3,946,892 | 3/1976 | Rigal et al. | 220/15 |
|---|---|---|---|
| 3,980,071 | 9/1976 | Barber, Jr. | 126/271 |
| 4,016,861 | 4/1977 | Taylor | 126/271 |
| 4,076,016 | 2/1978 | Phillips | 126/271 |

FOREIGN PATENT DOCUMENTS

| 2305697 | 10/1976 | France | 126/271 |
|---|---|---|---|
| 1138992 | 1/1969 | United Kingdom | 52/616 |

Primary Examiner—Kenneth W. Sprague
Assistant Examiner—James C. Yeung
Attorney, Agent, or Firm—Joe E. Barbee

[57] ABSTRACT

A solar heat collector having reduced convention losses until a predetermined absorber means excess temperature is reached and including a radiant energy absorbing means which has a first and a second surface. Means for the passage of a fluid to be heated is positioned in contact with the second surface of the absorbing means. Means for reducing conduction losses are positioned adjacent to the means for passage thereby sandwiching the means for passage between the absorbing means and the means for reducing. Glazing means which is transparent to radiant energy is positioned over the first surface of the absorbing means and is spaced apart therefrom thereby trapping air between the glazing means and the absorbing means. Means to suppress convection flow of the trapped air until a predetermined absorbing means temperature is reached. The means to suppress convection is located between the glazing means and the absorbing means thereby reducing losses due to convection from the absorbing means. The means to suppress convection losses provides for very high operating efficiencies at all operating temperatures up to a predetermined maximum, at which it ceases to function and the efficiency quickly reaches zero with any additional increase in collector operating temperature.

8 Claims, 6 Drawing Figures

SOLAR HEAT COLLECTOR WITH CONVECTION SUPPRESSOR

BACKGROUND OF THE INVENTION

This invention relates in general, to solar heat collectors and, more particularly, relates to solar heat collectors having convection suppressors.

Solar heat collectors or heat panels typically suffer from optical, radiation, conduction, and convection heat losses. A heat panel generally consists of a heat absorbing sheet which is oriented in a direction to receive incident solar radiation and a plurality of conduits which are positioned just below and in contact with the absorbing sheet to conduct a fluid thereby removing heat from the absorbing sheet. Insulation is normally placed around the bottom of the absorbing sheet and conduit to reduce conduction heat losses. A sheet of glass or other transparent glazing is placed above the absorbing sheet and traps a layer of air just above the absorbing sheet and also serves to protect the absorbing sheet from the elements. The glazing causes some losses which are called optical losses. As the trapped air heats up, convection currents are set up which result in heat losses. The convection currents tend to remove heat from the absorbing sheet as the trapped air passes over the sheet and then releases the heat as it passes adjacent to the glazing which is at a lower temperature than the absorbing sheet. These convection currents constitute a major mode of heat transfer away from the absorbing sheet of a high performance flat panel solar collector. If left unchecked, this convection heat loss mechanism severely retards the collection efficiency of such collectors, particularly in the high excess temperature range necessary for driving absorption type air conditioning units. Two general techniques that are used to reduce the convection losses are evacuation and geometrical cellular structures. However, these general techniques suffer from disadvantages which are overcome by the present invention. The evacuation technique involves creating a vacuum between the glass sheet and the absorbing sheet. This requires a sophisticated seal around the edges of the glass to prevent loss of the vacuum which increases the cost of the collector. In addition, the glass must be made stronger to withstand the atmospheric pressure bearing down upon it which also increases the cost of the collector. The cellular structures placed between the glass sheet and the absorbing sheet greatly reduce convection losses, however, the increased heat above a desired excess operating temperature requires the use of more expensive materials to prevent the destruction of the collector at these elevated temperatures. Many techniques for fabricating cellular structures have evolved over the years. These include the intermittent glueing of sheet stock and subsequently forming cells as with many paper goods in the making of honeycombs and the notching and assembling of steps in a regularized manner to achieve a matrix of small rectangular compartments. The use of glue in forming cellular structures is not only messy but is time consuming and costly. Therefore it should be appreciated that it would be desirable to solve the above and other problems.

Accordingly, it is an object of the present invention to provide an improved solar heat collector.

Another object of the present invention is to provide a convection suppressor which allows the use of plastics and other materials previously limited by their maximum operating temperature in solar thermal collectors which exhibit high operating efficiencies.

A further object of the present invention is to provide an improved convection suppressor that minimizes prestresses during manufacture thus preserving both the optical and structural qualities of the suppressor when it is placed within a solar collector and does not require glueing or bonding to assemble yet has a self-locking feature to facilitate handling.

Another object of the present invention is to provide a solar heat collector having reduced convection losses up to a predetermined excess temperature and wherein the convection losses increase rapidly above the predetermined excess temperature.

SUMMARY OF THE INVENTION

In carrying out the above and other objects of the invention in one form, there is provided an improved solar heat panel or collector. One embodiment of the invention provides a solar heat collector having a radiant energy absorbing means with a first and a second surface. Means for passage of a fluid, to be heated, is positioned in contact with the second surface of the absorbing means with means for reducing conduction losses positioned adjacent to the means for passage. Means to allow passage of radiant energy and to prevent passage of ambient air over the first surface of the absorbing means is positioned on the first side of the absorbing means and spaced apart therefrom thereby trapping some air between the means to allow passage of radiant energy and the absorbing means. Means to suppress convection flow of the trapped air until a predetermined temperature is reached is placed between the means to allow passage of radiant energy and the absorbing means thereby reducing convection losses until the predetermined temperature is reached and allowing convection losses to increase rapidly at temperatures above the predetermined temperature. This reduces the ultimate temperature which the collector reaches and allows materials of lower maximum operating temperature capability to be used in construction of the solar heat collector.

A method is also provided for making a convection suppressor for use in a solar heat collector wherein the convection suppressor has a predetermined height and a plurality of individual cells. Strips are cut from a sheet of material having a width which is equal to the predetermined height. These strips are then punched with a pattern which repeats itself at intervals equal to a desired width of the individual cells. Alternatively the pattern can be punched into the sheet and then the strips cut from the sheet in a manner so that the desired pattern is on the sheet. The strips are then meshed together at right angles to each other to form the plurality of individual cells in a rectangular grid. The strips are interlocked together due to the punched pattern.

The subject matter which is regarded as the present invention is set forth in the appended claims. The invention itself, however, together with further objects and advantages thereof, may be better understood by referring to the following detailed description taken in conjunction with the accompanying drawings.

The exemplifications set out herein illustrate the preferred embodiments of the invention in one form thereof, and such exemplifications are not to be construed as limiting in any manner.

DESCRIPTION OF THE PREFERRED EMBODIMENTS

Figure 1:
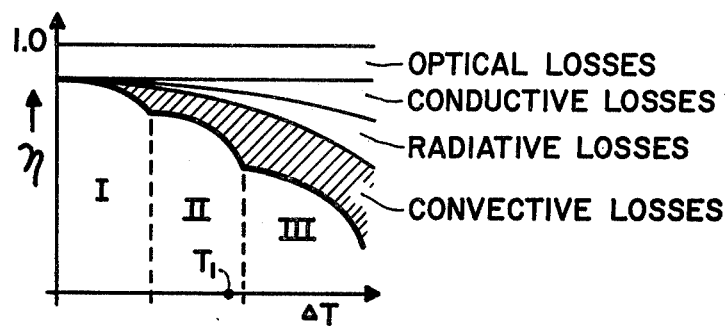
FIG. 1 is a graph which illustrates the typical convection losses in a prior art solar heat collector.

The excess temperature or Delta temperature ($\Delta T$) of a solar heat collector is equal to the average collector temperature minus the ambient air temperature. The excess temperature required of a solar heat collector depends upon the use intended for the solar heat collector. A solar heat collector would not need a very large excess temperature if it were used for heating the water in a swimming pool while a collector used to heat water for domestic purposes would require a higher excess temperature. A collector being used for driving an absorption air conditioning unit would require yet a higher excess temperature. As can be seen in FIG. 1 the higher the excess temperature, $\Delta T$, the greater the convection losses. Excess temperature is plotted along the ordinate of the graph while useful energy collected divided by incident solar energy and represented by the Greek letter Eta ($\eta$) is plotted along the abscissa of the graph. When $\eta$ has a value of 1.0 it means that the useful energy collected is equal to the incident solar energy and only comes close to occurring at low values of $\Delta T$. As the excess temperature increases the portion of the area above the curve, having the slash marks, also increases and represents the heat loss by convection effects. The heat loss in region I is due mainly to air conduction only. In region II the air trapped between the glazing material and the absorber sheet of a solar collector commences laminar natural convection flow thereby increasing convective losses in the collector. In region III the convection flow becomes turbulent as the temperature increases thereby rapidly increasing convection losses which decrease the available useful energy collected. An ideal solar heat collector would have an extended region I with a very small region II so that the useful energy collected would remain high until a desired maximum excess temperature is reached and region III is entered and then the losses would increase rather rapidly thus limiting the upper temperature extreme which the collector can obtain. By having the losses increase rapidly, heat is removed from the solar collector in the form of losses thereby permitting use of materials with lower temperature tolerances which are in general less expensive. As will become apparent hereinafter the preferred embodiment of the present invention approaches this ideal situation. Generally, a solar collector is only required to supply heat up to some predetermined excess temperature such as illustrated by $T_1$. Operating above $T_1$ provides no useful function but only serves to overheat the collector thereby requiring materials that will tolerate the higher temperatures which usually increases the cost of the collector.

Reducing the convective losses do not affect the other losses (optical, conductive, radiative). However, it should be noted that as the excess temperature increases, it is the convective losses that increase most rapidly. Therefore by decreasing these convective losses below the predetermined excess temperature, the efficiency of a solar heat collector is improved.

Figure 2:
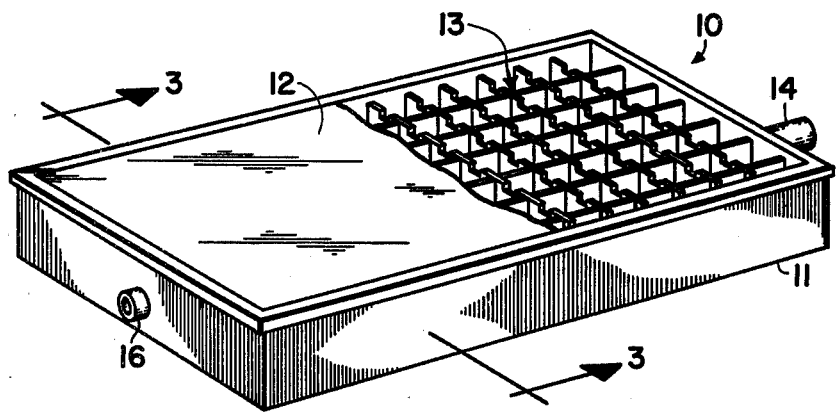
FIG. 2 is a perspective view of a solar heat collector with parts cut away and parts removed.

FIG. 2 shows a solar heat collector 10 having a frame 11 which holds glazing or glass 12 over the top of the collector. Glazing 12 is partially cut away to illustrate cellular structure 13 below the glazing. Inlet 14 receives water or other suitable fluid into collector 10 which is heated by collector 10 and discharged through outlet 16. Glazing 12 is transparent to incident solar radiation and serves to keep ambient air or wind from coming directly in contact with a solar energy absorbing sheet or surface which is located beneath cellular structure 13. Glazing 12 also serves to keep rain, snow, and dust off the absorbing sheet. Glazing 12 is usually glass but can be any transparent material such as certain plastics. Cellular structure 13 is a convection suppressor which suppresses convection flow of air trapped beneath glazing 12.

Figure 3:
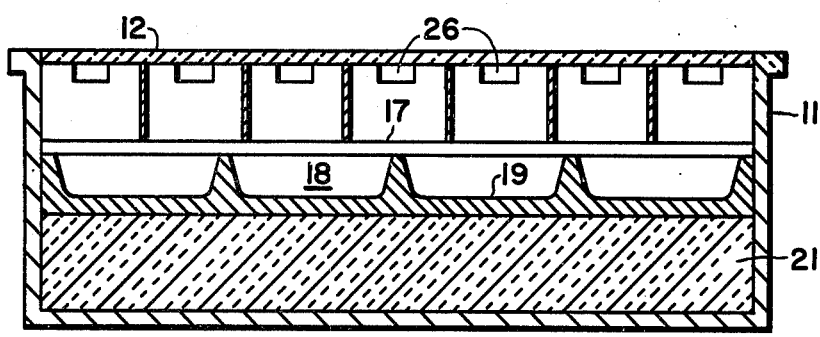
FIG. 3 is a cross-sectional view of the solar heat collector of FIG. 2 illustrating the invention in one form thereof.

FIG. 3 is a cross-sectional view of solar collector 10 taken along the lines 3—3 of FIG. 2. FIG. 3 shows convection suppressor or cellular structure 13 located between glazing 12 and absorbing surface 17. Surface 17 is a blackened surface or heat collector sheet which collects incident radiant energy. Absorbing surface 17 can have either a selective or nonselective coating. Fluid conduit 19 is located immediately below absorbing surface 17 and has passages 18 through which a suitable fluid can flow thereby being heated by surface 17. Insulation 21 is located below conduit 19 to reduce conductive energy losses. Convection suppressor 13 has openings 26 which allow turbulent convection flow, once the excess temperature exceeds a desired operating temperature, thereby removing some of the heat from surface 17. Convection suppressor 13 wll suppress convection losses until the convection flow becomes turbulent at which temperature the convective losses will become large with any additional temperature rise thus forcing the collector efficiency to zero.

Figure 4:
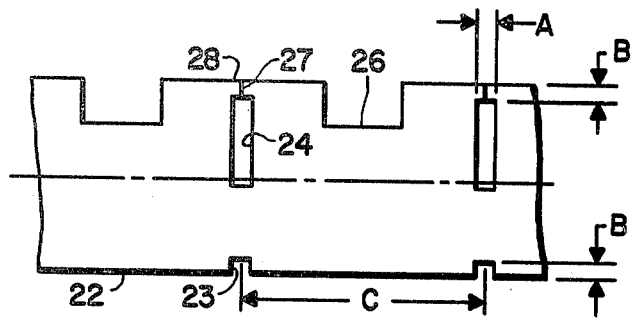
FIG. 4 is a plan view of a portion of a strip of material which has been punched in accordance with one embodiment of the invention.

A portion of a strip of material useful for making convection suppressor 13 is illustrated in FIG. 4. Strip 22 can be of any suitable material which is transparent to the incident radiant energy. Clear thermoplastics are a suitable material. Some specific examples being polycarbonate, sold under the General Electric trademark LEXAN, methyl methacrylate sold under the Rohm and Haas Inc. trademark PLEXIGLAS, poly imides such as KAPTON sold under the DuPont trademark, or polyester which is available under various trade names. The selected material must be capable of withstanding the collector operating temperatures and in most applications would be approximately 200° to 300° F. A small notch 23 is cut or punched out of strip 22 and can have a width, A, of 1 to 2 times the thickness of the material used, but preferably is 1.2 times the thickness of the material used. The depth B of notch 23 may be from 1 to 5 times the thickness of the material and preferably is 2 times the thickness of the material. Cutout 24 also may have the same width A as notch 23 and extends through the centerline of strip 22. Cutout 24 does not extend all the way to the edge of strip 22 in order to provide material for self-locking tab 28. A slit 27 extends from cutout 24 to the edge of strip 22. This divides self-locking tab 28 into two portions. The distance from the edge of strip 22 to cutout 24 can be equal to B, the depth of notch 23. Due to manufacturing tolerances distance B for cutout 24 is preferably just slightly smaller than distance B for notch 23. A portion of the material of strip 22 is removed from the edge to provide opening 26. The size of the opening 26 is determined by when it is desired to have cell to cell convection current flow. This is determined by the maximum excess operating temperature desired. The size of the opening is inversely proportional to the excess temperature at which turbulent flow or thermal instability is allowed to remove excess heat from the solar collector. The dimension C establishes the width of a cell made from strips 22 and of course establishes the repetition of the pattern formed by notch 23, cutout 24, opening 26, and slit 27. The magnitude of C is determined by the desired aspect ratio of the cellular structure. The aspect ratio is equal to the height of the cell divided by the width of the cell and when made from strip 22 the height is determined by the width of strip 22 while the width of the cell is determined by dimension C. An aspect ratio of 4 to 5 will give adequate protection up through excess temperatures useful for domestic requirements for heating and air conditioning. As the aspect ratio increases the size (width) of the cells decrease thereby requiring more strips 22 to make the cellular structure. The increased number of strips would tend to decrease the efficiency of the solar collector because the radiant energy absorbed by the walls of the cells would begin to add up significantly. In other words, the great number of walls of the cells would absorb the radiant energy before it reaches the black absorbing sheet. The walls also can conduct heat away from the absorbing sheet and as the number of walls increase, these conductive losses begin to add up. Accordingly, it is preferable to use relatively thin material to construct the cellular structure. Material having a thickness of one to five mils would be satisfactory, however, these thicknesses are not to be limiting since the controlling factor is the amount of losses caused by the material.

Figure 5:
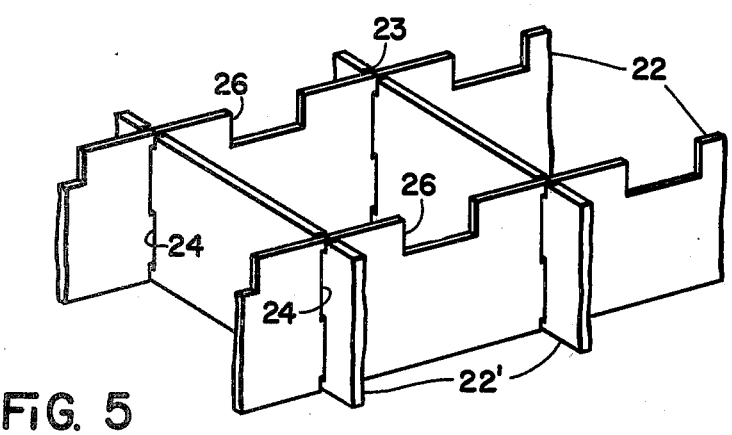
FIG. 5 is a perspective view of a portion of a convection suppressor illustrating one embodiment of the present invention.

FIG. 5 illustrates several strips 22 arranged to form a portion of a convection suppressor. Strips 22 are meshed with strips 22'. Strips 22' are the same as strips 22 with the exception that the strips 22' do not have an opening 26. This prevents cell to cell mixing in both directions but allows cell to cell mixing in only one direction at excess temperatures above a predetermined excess temperature. The exact height and width of opening 26 along with the slope of the collector with respect to horizontal dictate the excess temperature at which cell to cell mixing occurs. By including an opening 26 in strips 22', the cell to cell mixing occurs in both directions which is advantageous for solar collectors mounted in a horizontal or near horizontal attitude. When strips 22 are meshed with strips 22' self-locking tab 28 fits in notch 23 of the mating strip. Self-locking tab 28 allows a cellular structure manufactured with strips 22 to be handled without having all the strips fall apart. This is a very useful feature when assembling a solar collector. An alternate arrangement of a cellular structure can be made by inverting every other strip 22, or in other words, moving the opening 26 in every other strip from the top of the strip to the bottom of the strip. In this manner cell to cell mixing would occur by convection currents going over the top of one cell and out through the bottom of that cell into the adjacent cell. This alternative arrangement will result in an increased operating excess temperature range and still give zero operating efficiencies at excess temperatures just above the predetermined operating temperature.

Figure 6:
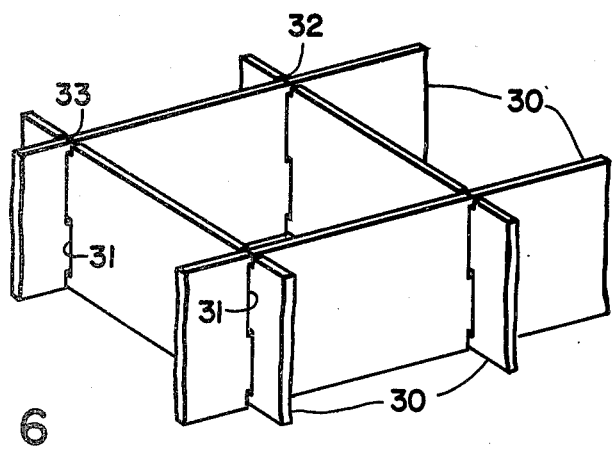
FIG. 6 is a perspective view of a portion of another embodiment of the convection suppressor.

FIG. 6 illustrates another embodiment of a convection suppressor employing the interlocking features of the cellular structure of FIG. 5. All the strips 30 can be punched with the same punch and the strips are assembled by inverting the cross strips. Each strip 30 has a notch 32 and a cutout 31 with a slit 33. As will be understood by those persons skilled in the art the use of a cellular structure such as illustrated in FIG. 6 would provide a solar collector capable of operating at very high excess temperatures. One of the important features is the manner in which the cellular structure can be assembled which does not require adhesives or other bonding methods and yet permits handling of the structure without having the structure fall apart. This is due to the self-locking capability of the structure.

Cellular convection suppressors which are utilized in solar thermal collectors serve several functions. Optically, they are expected to be highly transparent. Thermally, they are expected to be nonconductive in order to maintain a highly insulative layer of stagnate air over the absorbing surface throughout the collector's working temperature range and to provide a high convective loss rate mechanism at temperatures above the collector's working range. Structurally the convection suppressor is considered a layer within a stacked composite structure and therefore it must be capable of high compressive and shear loading. Not only must all these requirements be met but yet the structure must use low cost materials and the manufacturing costs must also be low.

One method that can be followed in manufacturing a convection suppressor in accordance with the present invention is to cut strips, from a sheet of material which would be suitable for use, of a width which equals the desired height of the suppressor. These strips can then be punched or cut in the configuration illustrated in the drawings. These strips can then be meshed at right angles to form the rectangular grid. Due to the self-locking tabs provided by the punched configuration the unit as assembled has a minimum of prestresses resulting from the joints. In addition, the cell walls are free to expand and contract as the collector goes through its daily temperature cycle. An alternate method would be to punch the desired pattern into the sheets of material and then to cut the strips from the sheet with the strips having the desired pattern.

By now it should be appreciated that there has been provided an improved solar thermal collector which allows the use of plastics and other materials limited previously by their maximum operating temperature and yet which exhibits high operating efficiencies at large excess temperatures. The present invention reduces elevated excess temperatures without adversely affecting the solar collector efficiencies at lower excess temperatures. This invention provides a low cost, high quality heat collector which is suitable for use for absorption type air conditioners and Rankin cycle engines. The improved cellular convection suppressor minimizes prestresses during manufacture thereby reducing effects of both the optical and structural qualities of the suppressor. The suppressor can be easily assembled without requiring bonding compounds or processes to hold it together during handling.

Consequently, while in accordance with the Patent Statutes, there has been described what at present are considered to be the preferred forms of this invention it will be obvious to those skilled in the art that numerous changes and modifications may be made herein without departing from the spirit and scope of the invention, and it is therefore aimed in the following claims to cover all such modifications.

What is claimed as new and desired to secure by Letters Patents of the United States is:

1. A solar heat collector having passages for flow of a fluid therethrough, comprising: a heat collecting sheet capable of absorbing a portion of incident solar radiation to which the heat collecting sheet is exposed, the passages being located adjacent to and in contact with the heat collecting sheet; insulating material located adjacent to the passages to reduce conductive heat losses; a transparent sheet placed a distance from the heat collecting sheet and on a side opposite from the passages; and a convection suppressor located between the transparent sheet and the heat collecting sheet to suppress laminar convection movement and retard the creation of turbulent movement of air which is trapped under the transparent sheet, the convection suppressor having a plurality of individual cells wherein each cell contains a portion of the air trapped under the transparent sheet, each cell having an access opening to an adjacent cell so that cell-to-cell air flow can exist at excess temperatures greater than a predetermined operating excess temperature.

2. The solar heat collector of claim 1 wherein, the convention suppressor cells are substantially rectangular having at least four walls and have the access opening located along two of the four walls of each convention suppressor cell and being aligned so that cell-to-cell mixing of the air occurs in a straight line.

3. A solar heat collector having passages for flow of a fluid therethrough, comprising: a heat collecting sheet capable of absorbing a portion of incident solar radiation to which the heat collecting sheet is exposed, the passages being located adjacent to and in contact with the heat collecting sheet; insulating material located adjacent to the passages to reduce conductive heat losses; a transparent sheet placed a distance from the heat collecting sheet and on a side opposite from the passages; and a convection suppressor located between the transparent sheet and the heat collecting sheet to suppress laminar convection movement and retard the creation of turbulent movement of air which is trapped under the transparent sheet, the convection suppressor having a plurality of individual cells wherein each cell contains a portion of the air trapped under the transparent sheet, each cell having an access opening to an adjacent cell so that cell-to-cell air flow can exist at excess temperatures greater than a predetermined operating excess temperature, and the convection suppressor cells are substantially rectangular having at least a first and a second wall, each of the at least a first and a second wall having a bottom and a top with the bottom located adjacent to the heat collecting sheet, and each cell having a first and a second access opening with the first access opening located at the top of the first wall and the second access opening located at the bottom of the second wall which is located opposite to the first wall having the first access opening, the cells being arranged so that cell-to-cell mixing of air can occur in a straight line pattern with the air flowing over the top of one wall into an adjacent cell and through the bottom opening of the adjacent cell.

4. A solar heat collector, comprising: a radiant energy absorbing means having a first and a second surface; means for passage of a fluid to be heated and positioned in contact with the second surface of the absorbing means; means for reducing conduction losses positioned adjacent to the means for passage thereby sandwiching the means for passage between the absorbing means and the means for reducing; means to allow passage of radiant energy and to prevent passage of ambient air over the first surface of the absorbing means, the means to allow passage being positioned on the first side of the absorbing means and spaced apart therefrom thereby trapping some air between the means to allow passage and the absorbing means; means to suppress convection flow of the trapped air until a predetermined excess temperature is reached, thereby reducing losses due to convection at temperatures below the predetermined excess temperature, and the means to suppress being located between the means to allow passage and the absorbing means, the means to suppress having a plurality of substantially rectangular cells each cell having at least a first and a second wall having a top and a bottom, the first wall having an opening at its top and the second wall being opposite to the first wall and having an opening at its bottom so that turbulent convection flow of the trapped air can pass from one cell to another by passing over one wall of a cell and under an opposite wall of the same cell.

5. A convection suppressor for use in a solar heat collector comprising a plurality of individual cells, each cell being substantially rectangular in shape and having at least a first and a second wall, each cell sharing a wall with an adjacent cell, each cell having an opening in the first and second wall, the first and second wall being opposite to each other, the openings permitting cell-to-cell flow of air once the solar collector has reached a predetermined temperature thereby providing a convection suppressor which substantially reduces convection losses at lower values of effective solar collection temperature yet permits convection losses at higher values of effective solar collection temperature.

6. The convection suppressor of claim 5 wherein the walls of the cells have self-locking means to hold the walls together as a structure.

7. A convection suppressor useable in a solar heat collector comprising a plurality of cells each having at least four walls with a first wall and a second wall being opposite from each other, the first and the second wall each having a cutout portion, at least the first and second walls serving as common walls with adjacent cells, and the cells being arranged to permit flow of fluid from cell-to-cell to be by way of the cutout portions in the opposite walls of the cells.

8. The convection suppressor of claim 7 wherein the walls of the cells have self-locking means to hold the walls together.

* * * * *